Aug. 26, 1941.    F. L. WHITE    2,254,192
PORTABLE EXCAVATOR
Filed Feb. 10, 1940    4 Sheets-Sheet 1

INVENTOR.
FRED L. WHITE
BY
Alfred F. Dees
ATTORNEYS.

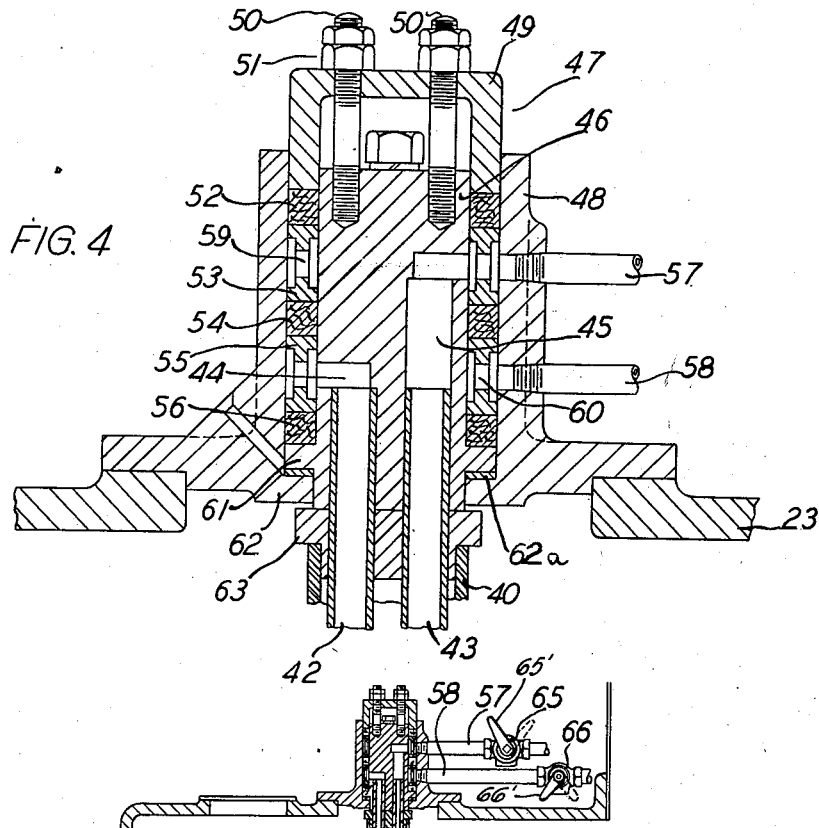
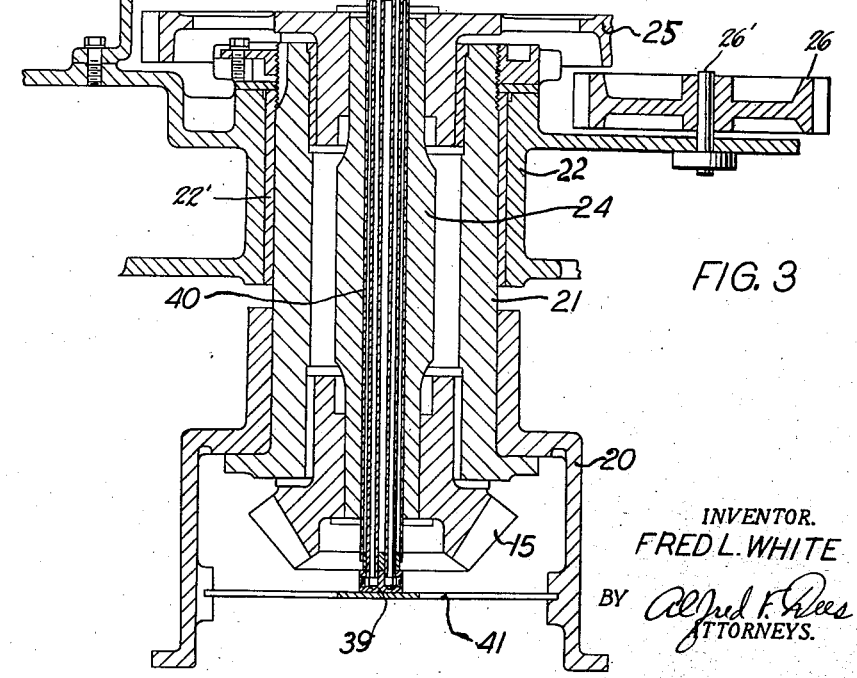

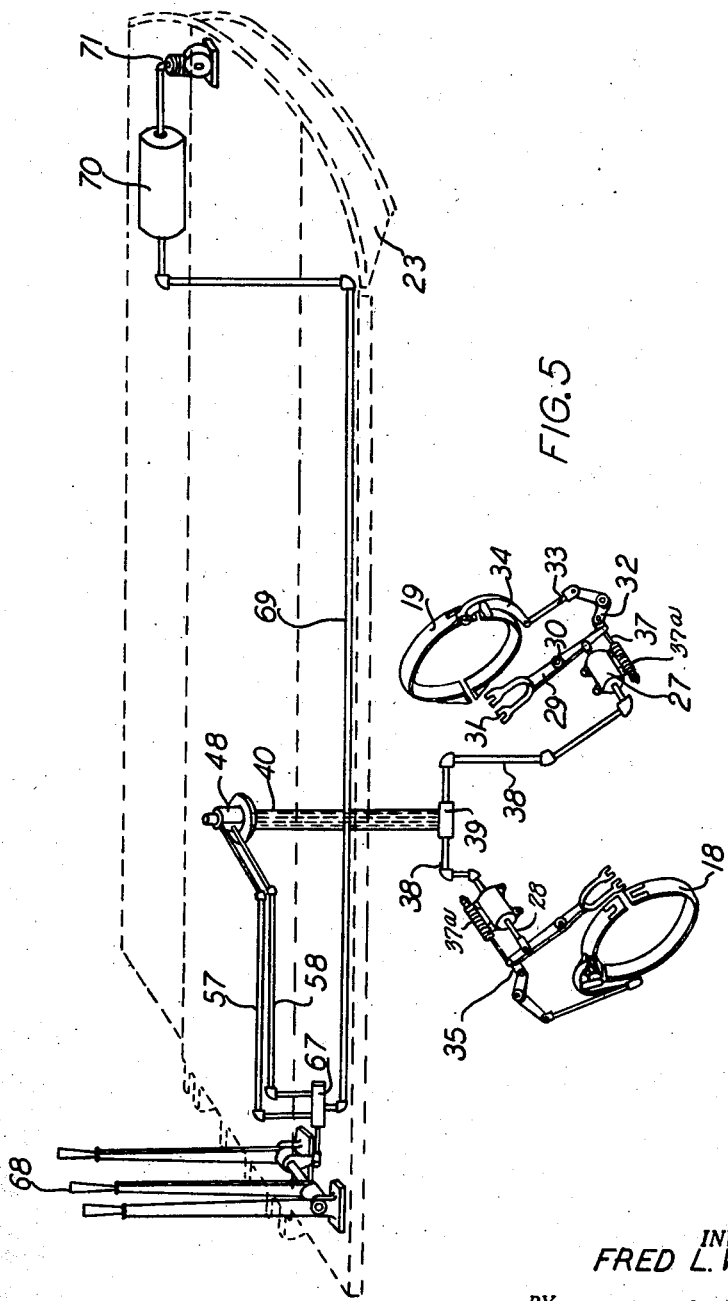

Aug. 26, 1941.  F. L. WHITE  2,254,192

PORTABLE EXCAVATOR

Filed Feb. 10, 1940  4 Sheets—Sheet 4

INVENTOR.
FRED L. WHITE
BY *Alfred F. Dees*
ATTORNEYS.

Patented Aug. 26, 1941

2,254,192

UNITED STATES PATENT OFFICE 2,254,192

PORTABLE EXCAVATOR

Fred L. White, Marion, Ohio, assignor to The Osgood Company, Marion, Ohio, a corporation of Ohio Application February 10, 1940, Serial No. 318,332

21 Claims. (Cl. 180—9.2)

This invention relates to a crawler type excavating machine and in its more specific aspects relates to a steering control mechanism therefor that is pressure fluid operated, and to a more efficient means and mechanism for applying the pressure fluid to the steering control device.

The object of this invention is to improve the steering control device on a crawler type of excavator.

Another object of the invention is to simplify the power actuated steering mechanism for a crawler type self-propelled vehicle.

A still further object of the invention is to eliminate the inflexible linkage mechanism of the straight mechanical types of hand operated steering mechanisms.

A still further object of the invention is to provide a simple, easily operated pressure fluid valve system to control steering of the excavator traction device and thereby eliminating the cumbersome lever linkage for steering crawler or wheel type traction devices.

Another and still further object of the invention is to provide a steering control mechanism for the traction device of a portable excavator which is operable during rotation of the cab platform and the movement of the excavator.

Other and further objects of the invention will appear as the description proceeds which taken in connection with the accompanying drawings sets forth a preferred embodiment of the invention but such disclosures and description are not be taken as limitations of the invention which is limited only by the appended claims and any and all alterations, modifications and variations coming within the spirit and scope of the invention are deemed to be included herein.

In the drawings:

Figure 3 shows a vertical sectional view of the power transmission means to the traction device taken substantially along the line 3—3 of Figure 2.

Figure 4 is an enlarged view of the upper part of Figure 3 to show details thereof.

Figure 5 is a schematic view showing the essential elements of the control in relation to the rotatable platform of the excavator.

Figure 1:
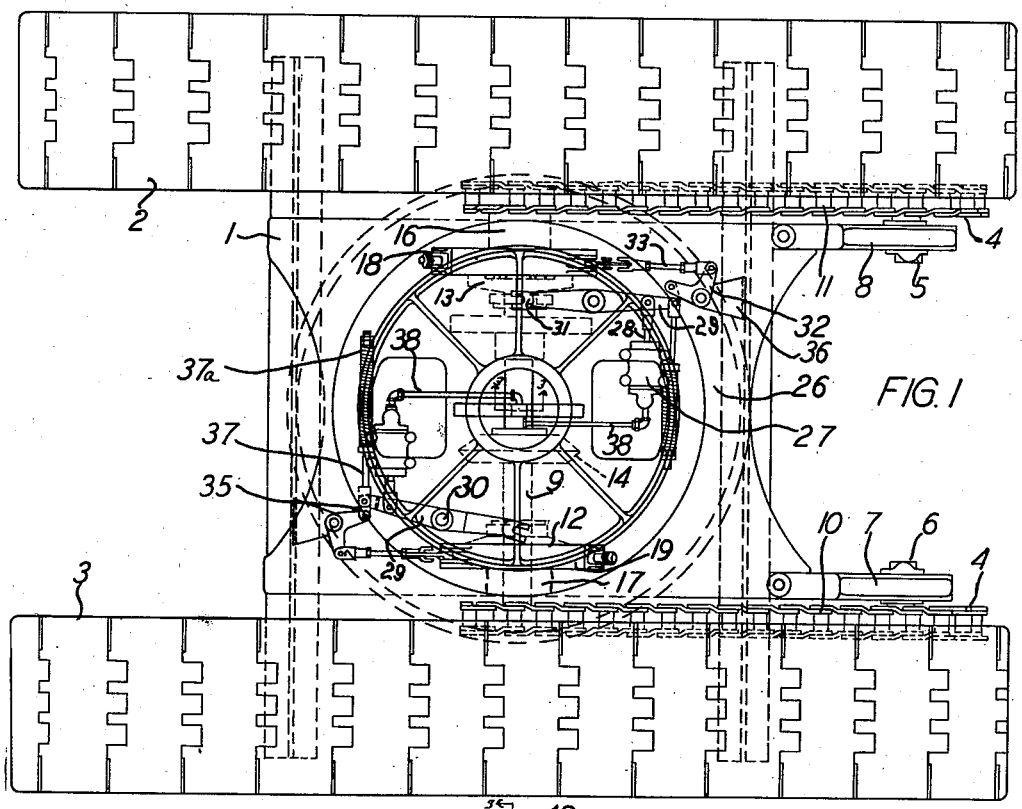
Figure 1 shows a top plan view of the traction device of a portable excavator incorporating the invention.
Figure 2:
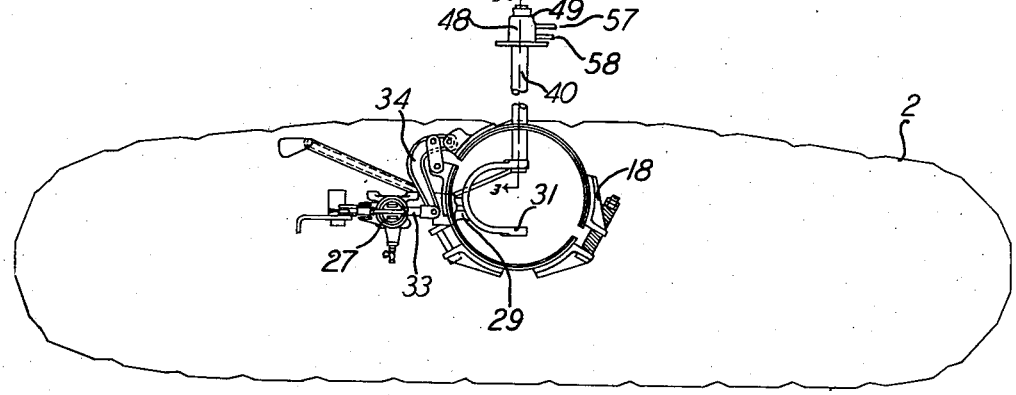
Figure 2 shows side elevational view of the essential control elements of the steering mechanism.
Figure 6:
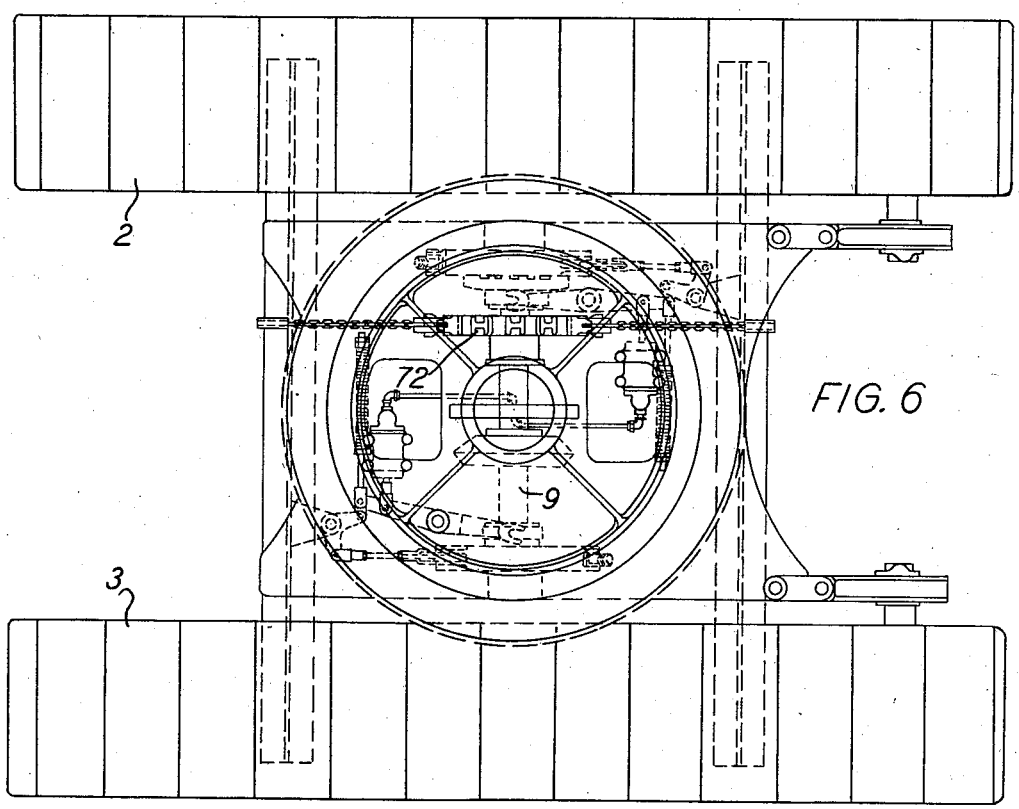
Figure 6 is a view similar to Figure 1 but showing the traction holding device incorporated into the crawler transmission.
Figure 7:
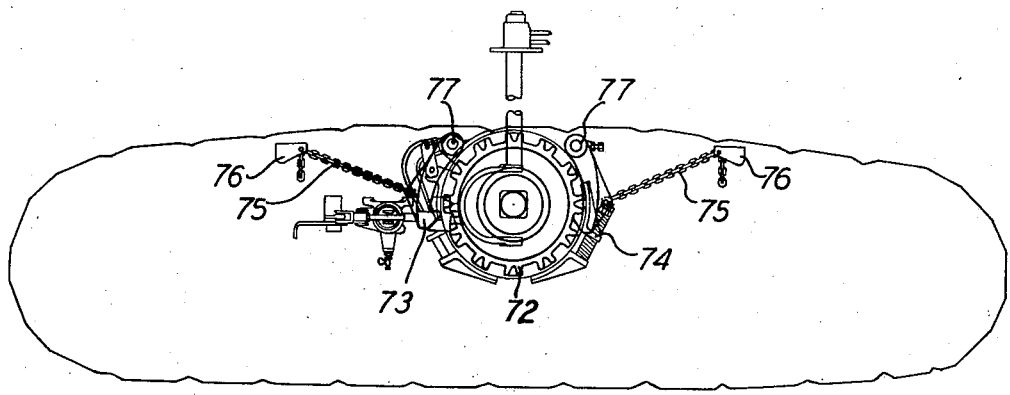
Figure 7 is a view similar to Figure 2 but showing in addition the end elevational view of the holding device in relation to the crawler treads.

The directional control of a crawler type of traction device customarily employed in connection with the portable type of excavators has in the past always been accomplished by a very trying and difficult manipulation of levers to engage and disengage the clutches and brakes that control one or the other of the two surface contacting elements whereby a steering of the device is effected. It has customarily been necessary to stop the traction device in order to effect such steering. The applicant has therefore developed a device which does away with the laborious hand operated device and has provided a motor operated control whereby the steering of the traction device is performed while the excavator is traversing the ground and may also be operable while the dipper is being employed.

With the above in mind, the device in its preferred embodiment comprises initially a frame 1 on which are rotatably mounted treads or traction devices 2 and 3, mounted in suitable ways well known to the art, and which serve to drive the device in any desired direction. The frame 1 mounts sprockets 4 carried on shafts 5 and 6 additionally supported in outboard bearings 7 and 8. The frame mounts a drive shaft 9 rotatably supported therein and which is provided with sprockets at each end thereof. Roller chains 10 and 11 are connected between the sprockets carried on shaft 9 and the sprockets carried on shafts 5 and 6. Clutch elements 12 and 13 are mounted on the shaft 9 and are adapted to be selectively engaged with the sprockets carried on shaft 9 to transmit power to the roller chains that drive treads 2 and 3. Shaft 9 carries a bevel gear 14 that engages a bevel gear 15 having a squared hollow shank or hub carried in the portion of the machine that supports the rotatable platform hereinafter described.

Secured to the sprocket hubs 16 and 17 are appropriate brake drums with which brakes 18 and 19 operate. The general purpose of the two brakes is to lock one sprocket against rotation while the corresponding clutch is disengaged and with the other sprocket connected to the shaft may rotate the corresponding tread and thereby enable the moving tread to twist the traction device to steer the excavator in any desired direction.

Mounted on the frame 1 is a supporting structure 20 integral with part 1 (see Figure 3). This structure carries a sleeve 21 that supports bevel gear 15 previously described as driving bevel gear 14 mounted on shaft 9. Supported on the sleeve 21 is a housing 22 in which the platform 23 is associated. Appropriate bearing structure 22' is provided that enables a relative rotation between portions 21 and 22. Centrally disposed of the aforementioned structure is a hollow shaft 24 having squared ends to which bevel gear 15 is rigidly secured and which has at its upper end a second gear 25 that is telescoped and journaled in sleeve 21. The gear 25 having a squared center opening is connected to an appropriate source of power well known in the art. Secured to the housing 22 is a gear 26 rotatably mounted on shaft 26' that is appropriately connected to the source of power hereinbefore described whereby the cab platform 23 may be rotated at the will of the operator. The squared openings in gears 15 and 25 press fit snugly over the squared ends of shaft 24 to prevent relative rotation of the parts. Appropriate transmissions likewise well known in the art are provided to accomplish the foregoing result. It should be apparent that the structure thus far described is more or less conventional in character and is intended to lay the background for that which is considered to be new and novel in the instant case.

It has been stated that the steering of the traction device of the excavator is accomplished by stopping the motion of one of the treads 2 and 3 and permitting the other to move depending upon the direction in which it is desired to steer the machine. In the instant case a single acting pressure fluid motor 27 is mounted on the frame 1 and is provided with a piston rod 28 secured to a piston (not shown). The piston rod is pivotally connected to a bar member 29 which in turn is pivoted to the frame 1 upon pivot 30. Each bar 29 is equipped with a yoke 31 that engages with clutches 12 and 13 and is adapted to engage or disengage the clutches with the sprocket and brake members cooperating therewith. Bar 29 is further provided with a suitable linkage 35 that is connected to a pivotally mounted bell crank lever 32 supported on the frame 1. A brake actuator lever 34 has connected thereto a rod 33 that is connected to one arm of the swingable bracket 32. A member 36 directly secured to frame 1 provides the means for supporting the swingable bracket member 32 on the frame 1. Bar 29 has a second rod 37 pivotally secured thereto which is engaged at one end by a coiled compression spring 37a. The purpose of each of the springs 37a is to release the brake 19 and to engage the clutch 12 or 13 upon the release of the pressure fluid from the motors 27. The normal operating condition is for the clutches to be engaged and the brakes disengaged. The springs 37a normally maintain this condition. Each brake and clutch actuator is provided with identical linkage mechanism connecting same with motors 27 for operating the brake and clutch mechanisms mounted on each end of the shaft 9.

A source of pressure fluid has been provided for the operation of motors 27 which is mounted on the cab platform 23 and appropriate valves and conduits has also been provided for selectively directing the pressure fluid down to said motors. This structure incorporates the control for the clutches and brakes and the entire combination avoids the use of flexible tubing to transmit the pressure fluid from the rotatable cab platform to the motors 27 mounted on the relatively stationary frame 1. Conduits 38 are connected between the inlet to the motors 27 and a head 39 that is mounted near the lower end of shaft 24, gear 15 and housing 20. Head 39 is mounted on the lower end of a tube 40. The tube 40 is fixed relatively in the shaft 24 and is partly maintained in position by means of a plate 41 secured in part in support 20 fastened to or integral with the frame 1. The head 39 is directly supported upon the plate 41.

Within the tube 40 are two conduits 42 and 43. The conduits 42 and 43 are directly connected to each conduit 38 through the head 39 and extend upwardly and are connected to passageways 44 and 45 provided in core 46 of rotary coupling 47. The rotary coupling further consists of a casing 48 that is removably secured to a portion of the platform 23. As has been previously indicated a core 46 is relatively stationarily fixed with respect to the casing. In order that pressure fluid may be admitted to the conduits 42 and 43 in any rotational position of the cab platform 23 sleeve 49 has been provided that is secured by means of studs 50 and hexagonal nuts 51 to the core 46 as more particularly shown in Figure 4. The casing 48 has secured thereto conduits 57 and 58 which connect directly with conduits 43 and 42 respectively through the passageways 44 and 45. To provide a means for transmitting this pressure fluid from one set of conduits to the other a pair of grooved rings 53 and 55 have been provided that connect directly with the passageways 44 and 45.

Each of the rings 53 and 55 is externally and internally grooved and provided with a plurality of apertures 59 and 60 whereby the pressure fluid is transmitted to the passageways 44 and 45 located in the core of the rotatable couplings. Suitable packing rings 52, 54 and 56 are interposed between the rings, the sleeve 49, the casing and the core to prevent the leakage of pressure fluid to the atmosphere and from the one conduit to the other. The core 46 is provided at its lower end with a flange 61 which is engaged on the one side by the packing ring 56 and on the other by a shoulder flange 62 integral with the casing 48 and bearing 62a. Directly beneath the extreme lower end of the core 46 is a head piece 63 into which the conduits 42 and 43 snugly fit and which head 63 also supports the tube 40 surrounding the conduits 42 and 43. It should be evident from the foregoing that by reason of the studs 50 that the sleeve element 49 tends to compress the packing rings 52, 54 and 56 and that the tube 40, in connection with the head 63 and the head 39 supporting the plate 41, is maintained in a rigid position and that the tubular construction of the conduit supporting elements enable the tube 40 to keep the predetermined position of adjustment. It is further evident that the aforementioned tube is particularly resistant to torsional strains imposed thereon by reason of the rotation of the casing 48 relative to the core 46 and the sleeve 49 and associated structures.

The control of the admission of pressure fluid to the motors 27 is effected by means of a pair of conventional hand wheel or removable lever type three way valves 65 and 66 shown in Figure 3 interposed between a convenient source of supply and the motors 27. Valves 65 and 66 are each provided with operating handles 65' and 66'; the full lines showing, for instance, a closed position in which no pressure fluid is admitted to pipes 57 and 58 and the dotted lines indicating the position of the handles and valve rotors in which pressure fluid is admitted; the selective opening and closing determining the steering or direction of travel. When the valves are in the dotted position the pressure fluid is exhausted from the clutch and brake motors and pressure fluid coming from a source of supply prevented from passing the respective valves. It is obvious therefore that the adjustment of the valves 65 and 66 will determine the direction in which the excavating device is intended to turn. In Figure 5 there is set forth a modification of the method of control for the motors 27. The conduits 57 and 58 instead of being connected to separate valves as in the illustration of Figure 3 are connected to a single valve 67 that in effect combines the two valves 65 and 66. The plunger of valve 67 is connected to a lever device 68 which controls selectively the application of pressure fluid to either of the motors 27. A conduit 69 leads to a pressure supply 70 from the valve 67 and the pressure tank is supplied from a compressor unit 71 driven by an appropriate source of power. The other levers shown in the illustration are for the control of other parts of the excavator and do not enter into the subject of the instant invention.

A safety device has been incorporated into the control which enables the traction device to be held in position or stationary should there be a failure in the pressure fluid conduit or in the transmission which would prevent the transmission of power to the treads 2 and 3, should this failure occur while the excavator is standing on an incline. Shaft 9 is provided with a ratchet wheel 27 that cooperates with ratchet pawls 73 and 74. These pawls are swingably mounted in the device on shafts 77 and during the normal operation of the transmission, the wheel 72 simply ratchets the pawls out of the way but in the event the traction device should attempt to coast the ratchets engage with the notches in the wheel and brake the coating of the machine down an incline. In the event it is desired to keep the pawls 73 and 74 in a disengaged position a chain 75 secured to each of them is connected to a cam type handle 76 for keeping them disengaged.

The above is considered to so fully set forth the gist of the invention that anyone by studying the principles thereof set forth in the above specification and the accompanying drawings may reproduce the same. That which is considered new, novel and useful and which is sought to be protected by Letters Patent of the United States is as follows.

I claim:

1. In a steering mechanism for a traction device, a pair of surface contacting elements, means to drive each of said elements, vertically disposed transmission means for supplying power to said driving means, a platform rotatably supported relative to said vertical means, braking means applied to each of said surface contacting elements, means to actuate said brakes, comprising a pair of fluid pressure actuated motors carried on said device to actuate said brakes, a source of pressure fluid, conduits connecting said source to said motors, a portion of said conduits being centrally disposed of said vertical means, coupling means to hold said portion against torsional strains and mounted for relative rotation of said transmission means, and valve means in a portion of said conduits mounted on said platform adapted to selectively actuate said motors to selectively brake either of said surface contacting elements to thereby steer said traction device.

2. In a power steering mechanism for a traction device, a main driving shaft, a pair of surface contacting elements, a pair of clutches mounted on said shaft, means operatively associating said clutches with said contacting elements, a pair of brakes mounted on said shaft, said brakes and said clutches being interlocked such that when one of said brakes is applied said clutch associated therewith is disengaged and vice versa, pressure fluid operated means to actuate each of said brakes and clutches, a platform, rotatable means extending from said platform to said shaft, means in said rotatable means having a pair of conduits therein and held stationary and rigid with respect to said rotatable means and adapted to prevent torsional strains being applied to said pair of conduits, conduits extending from said pressure fluid device to said conduits in said rotatable means, a source of pressure fluid on said platform, conduits extending from said source to said conduits in said rotatable means, a valve means in each of said conduits adapted to selectively apply pressure fluid to each of said pressure fluid operated means, and a rotatable coupling means mounted in said means whereby pressure fluid may be transmitted to said pressure fluid operated means in any rotational position of said platform.

3. In a portable excavator, a frame, a pair of traction devices rotatably mounted on the frame, a platform rotatably mounted on the frame, means connecting said frame and platform for rotatably associating said platform with said frame, means for propelling said excavator, including a shaft rotatably mounted in the frame and adapted to drive said traction devices, rotatable means in said connecting means for driving said shaft, means for steering said excavator, including a clutch and brake mounted on each end of said shaft, said clutch adapted to connect or disconnect the power to said treads, pressure fluid operated means to actuate said clutches and brakes, control means on said platform to selectively direct pressure fluid to each of said pressure fluid operated devices, conduits connecting said valve and said pressure fluid operated means, a torsion resisting tube mounted in said means rotatably mounting said platform, a rotary coupling connected to said tube, a portion of said conduits mounted in said tube and means to maintain said tube and said conduits in a predetermined alignment irrespective of the position of said platform, and said coupling operatively connected to said conduits to permit the transmission of pressure fluid irrespective of the rotative position of said platform.

4. In a device adapted to connect the rotatable platform of a power excavator to the traction device, a frame securable to the traction device, a second frame rotatably mounted with respect to said frame, supporting said platform and mounting a source of pressure fluid, pressure fluid governed means to drive said traction device means rotatably connecting the two frames including a sleeved member and adapted to transmit power to said means to drive said traction device receiving a tubular gear shaft element rotatably mounted in said gear shaft, a thin wall tube mounted in said sleeve, in a manner to resist torsional strain imposed by the rotation of said gear shaft, conduits supported in said tube, a rotary coupling supported on said tube and said platform, conduits connecting said source of pressure fluid and the coupling conduits connected to said coupling mounted on said tube, said coupling adapted to conduct pressure fluid from one set of conduit to the other and having means to prevent leakage of fluid from one conduit to the other irrespective of the relative rotational position of said platform, and conduits connecting said torsion tube conduit to said pressure fluid actuated means thru a torsion tube mounted head.

5. In a portable excavator, a traction device including a frame and a pair of treads rotatably mounted thereon, a drive shaft rotatably mounted in said frame, a combination clutch and brake mounted on each end of said shaft, said clutch adapted to operatively connect said shaft with one of said treads, said brakes adapted when said corresponding clutch is disengaged to steer said traction device, pressure fluid motors mounted on said frame to actuate said clutch and brake devices, a platform rotatably mounted on said frame, means to rotatably mount said platform on said frame, means to transmit power through said connection to said shaft, and including a tubular element, a pair of conduits carried by said tubular elements and connected to said motor, means rigidly mounting said conduits and tube in said connection to resist torsional strain imposed by said power transmitting means, a source of pressure fluid, a rotary coupling means carried by said platform and tubular element, a pair of conduits connected between said coupling and said source of pressure fluid, said coupling adapted to transmit pressure fluid to said conduits carried by said tubular element, control means to direct pressure fluid to either of said motors, and holding means carried by said shaft adapted to hold said traction device when either or both of said clutches is rendered inoperative.

6. In a steering device for a portable excavator, the combination, a frame, a pair of treads rotatably mounted on said frame, a drive shaft rotatably mounted in the frame, a pair of clutch and brake elements mounted on the shaft, a pair of single acting pressure fluid motors for said clutches adapted to operatively connect said shaft to said treads, means mounted on said frame and adapted to selectively actuate said clutch and brake elements, a platform rotatably mounted on said frame, means extending between said frame and said platform, rotatably supporting said platform, power transmitting means carried by said connection and connected to said shaft, a tubular element mounted in said connection, means mounting said tubular element and adapted to resist torsional strain in said element, a pair of conduits carried by said tubular element, one of said conduits being connected to each of said motors, a source of pressure fluid for said motors, a rotatable coupling supported on said tubular element and adapted to transmit pressure fluid to each of said motors, means connected to said conduits and adapted to selectively actuate said brakes and clutches to steer said excavator, and means to positively hold said excavator in any one position upon failure of said motors or said power transmitting connection.

7. In a portable excavator, a frame mounting a shaft provided with a pair of clutch and brake elements and adapted to drive endless traction elements, a platform rotatably mounted on said frame supporting a pump and control valves, means to rotatably mount said platform on said frame, a pair of pressure fluid motors mounted on said frame for operating each of said brake and clutch elements, a torsion resisting tube concentrically mounted in said means to rotatably mount said platform, a rotatable coupling the casing of which is fixed relative to said platform and also supported by said tube, a pair of conduits extending from said coupling to said motors, a second pair of conduits connecting said casing, said pump and said valves, means in said coupling to connect said two pair of conduits irrespective of the rotational position of said platform and valve means connected to said second pair of conduits whereby pressure fluid may be selectively applied to either of said motors, said coupling permitting the transmission of pressure fluid irrespective of the rotational position of the platform and prohibiting leakage of pressure fluid.

8. In a portable excavator, a drive shaft mounted in a frame, a rotatable platform, means to rotatably mount said platform on said frame and including a tube held against rotation therein, rotatable means in said means connected to said shaft, a pair of clutch and brake elements mounted on said shaft, a pair of motors to actuate said clutch and brake elements, a rotary coupling mounted on said tube, conduits connecting said motors and said coupling, a part of said conduits rigidly held in said tube, a second pair of conduits connected to said coupling and to a source of pressure fluid, said coupling connecting said two sets of conduits irrespective of the relative rotational position of said coupling, and a valve means to selectively apply pressure fluid to said motors.

9. Means for actuating the clutch and brake mechanism of a traction device, the combination, a pair of clutch and brake actuators, motor means to actuate same, a control means for selectively operating said motors to steer said traction device, said control means comprising a valve to selectively direct pressure fluid to said motors, conduits connecting said valves and motors, a rotatable platform on which said valves are mounted, a rotary coupling on said platform and in said conduits lines adapted to transmit pressure fluid to said motors in any rotative position of said platform and said coupling including means to permit the transmission of pressure fluid and without leakage to the atmosphere.

10. In a portable excavator; a frame; traction elements mounted on said frame; means to drive said elements; a platform rotatably mounted on said frame; means to rotatably mount said platform on said frame, said means including a power transmitting shaft connected to said means to drive said elements; means to steer said frame and traction elements, including pressure fluid operated means mounted on said frame to control said means to drive said elements; valve means to control said steering means mounted on said platform and rotatable therewith; conduits connecting said control and said pressure fluid operable means some of said conduits extending through said shaft; tube means in said shaft to hold said shaft conduits against torsional strains and coupling means connecting the different sections of conduits and supported on said tube, said coupling transmitting pressure fluid such that the steering of the excavator is possible in any rotational position of said platform.

11. In a control device for a portable excavator;

a frame; a rotatable platform on said frame; traction elements mounted on said frame; a sleeve which rotatably connects said platform and frame; means to drive said elements including a shaft in said sleeve; means to steer said excavator; means to control said steering mounted on said platform and operable in any rotational position thereof; means to connect said means to steer and said means to control said steering which includes pressure fluid devices extending through said shaft; a rotary coupling adapted to transmit pressure fluid in any rotational position of the coupling and the platform and means to fixedly hold said connecting means in said shaft against torsional strains.

12. In a steering mechanism for a traction device; a pair of surface contacting elements; means to drive each of said elements; a vertically disposed transmission means to supply power to said driving means; a platform rotatably supported relative to said vertical means; braking means applied to said surface contacting elements; means to actuate said brakes; comprising pressure fluid actuated motors; a source of pressure fluid mounted on said platform; conduits connecting said source to said motors; a portion of said conduits disposed in said vertical means and held against torsional strains; a rotary coupling connecting said conduits in said vertical means and the conduit leading from said source of pressure fluid adapted to transmit pressure fluid in any rotational position of the platform and valve means mounted on said platform to selectively actuate said motors to brake either of said surface contacting elements to steer said traction device.

13. In a mechanism adapted to rotatably support a platform on an excavator frame; a fixed element secured to the frame; a frame associated with said platform; a hollow shaft connecting said element and platform frame; means to transmit power rotatably mounted in said shaft; and a torsion resisting tube adapted to support conduits mounted concentrically of said shaft and extending between said element and said platform frame conduits mounted in said tube; a source of pressure fluid and control means mounted on said platform and connected to said tube mounted conduits and a rotary coupling connected between the tube conduits and the source of pressure and control means, said coupling adapted to transmit pressure fluid in any rotational position of the platform.

14. In a steering control for a portable excavator; a frame having power driven traction elements thereon; a cab platform; a hollow sleeve shaft connecting said platform and frame for relative rotation; means to drive said elements including a power shaft concentric with said hollow sleeve shaft; pressure fluid operated means to selectively apply power to said elements to steer the excavator; means to energize and control said pressure fluid means mounted on said platform; conduits to connect said platform mounted means and said pressure fluid operated means, and extending through said shafts; and means to conduct pressure fluid in any rotational position of said platform, including a tube fixedly held concentrically of said shafts, a rotary coupling on said platform and secured to said tube and adapted to transmit pressure fluid in any rotational position of the platform and conduits in said tube conected to said coupling to conduct pressure fluid through said shaft and thence by said conduits to said pressure fluid operated means.

15. In a portable power shovel; a drive shaft mounted in a frame; a rotatable platform; means to rotatably mount said platform on said frame and including a torsion resisting tube held against rotation therein; rotatable means in said means operably connected to said shaft; clutch and brake elements mounted on said shaft; pressure fluid means to selectively actuate said clutch and brake elements; a rotary coupling mounted on said tube and platform; conduits connecting said pressure fluid means and said coupling; a part of said conduits held against twisting in said torsion resisting tube; conduits connecting said coupling to a source of pressure fluid; said coupling connecting said conduits and adapted to transmit pressure fluid irrespective of the rotational position of said coupling and said platform and a valve means in said conduits to selectively apply pressure fluid to said means to actuate said clutch and brake elements.

16. In a portable excavator; a frame having traction elements; a platform; means to rotatably mount said platform on said frame; drive means for said traction elements; pressure fluid operable means to steer said frame and acting on said drive means; valve means to control said means to steer said frame, and mounted on said platform; and conduits connecting said pressure fluid operable means and said valve some of which are mounted in a portion of said drive means; a tube in said drive means adapted to hold said conduits against torsional strains imposed by said drive means; a rotary coupling which is adapted to positively conduct pressure fluid to said pressure fluid from said valve to said pressure fluid operable means in any rotational position of said platform, said coupling being disposed above and on said tube disposed in said drive means.

17. In a power shovel; a frame having traction elements thereon; a cab platform; means connecting said frame and platform for relative rotation; means to drive said traction elements including a shaft in said connecting means; fluid motor means to selectively apply power to said elements to steer said excavator; means to energize said fluid motor means mounted on the platform; valve means to control the selective application of pressure fluid to said steering means and mounted on said platform; conduits connecting said steering means, and said means to energize and said steering means, including rigid conduits mounted in said connecting means and fixed in a torsion tube which holds said conduits rigid; and means in said conduits to conduct pressure fluid in any rotational position of said platform which comprises a rotary coupling adapted to prevent leakage of pressure fluid and having one part secured to the platform and the other to said torsion tube.

18. In a power shovel; a frame including traction elements; a platform rotatably mounted on said frame; means to rotate said platform and drive said elements; concentric shafts connecting said frame and said platform, one shaft rotatably supporting said platform and the other shaft transmitting power to said elements; pressure fluid operated means to steer said traction elements and operably associated with said means to drive said traction elements; valve means to control said pressure fluid means mounted on said platform and operable in any rotatable position of said platform; conduits connecting said means to steer, and said valve means, some of which is mounted in one of said shafts, means to mount conduits in one of said shafts including a torsion resisting tube supporting said conduits and rotary coupling means supported on said platform and tube to transmit pressure fluid to said pressure fluid operated means in any rotational position of said platform.

19. In motor operated excavator; a frame; a pair of traction elements on said frame; a cab platform; shaft means connecting said frame and platform; means to drive said elements; means to selectively drive either of said traction elements to steer said excavator including a drive shaft in said shaft means; pressure fluid operated motors to effect the steering of the excavator; a source of pressure fluid and control valves for said motors mounted on said platform; means in said shaft to support a pair of conduits comprising a torsion resisting tube means; a rotary coupling connected to said tube and also supported on said platform; conduits connecting said coupling, said valve and source of pressure and other conduits connecting said tube mounted conduits and said motors; said coupling and torsion tube permitting the transmission of pressure fluid in any rotational position of said platform.

20. In a portable excavator, a traction device including a frame and a pair of treads rotatably mounted thereon, a drive shaft rotatably mounted in said frame, a combination clutch and brake mounted on each end of said shaft, said clutch adapted to operatively connect said shaft with one of said treads, said brakes adapted when said corresponding clutch is disengaged to steer said traction device, pressure fluid motors mounted on said frame to actuate said clutch and brake devices, a platform rotatably mounted on said frame, means to rotatably mount said platform on said frame, means to transmit power through said connection to said shaft, and including a tubular element, a pair of conduits carried by said tubular elements and connected to said motor, means rigidly mounting said conduits and tube in said connection to resist torsional strain imposed by said power transmitting means, a source of pressure fluid, a rotary coupling means carried by said platform and tubular element, a pair of conduits connected between said coupling and said source of pressure fluid, said coupling adapted to transmit pressure fluid to said conduits carried by said tubular element, and control means to direct pressure fluid to either of said motors.

21. In a steering device for a portable excavator, the combination, a frame, a pair of treads rotatably mounted on said frame, a drive shaft rotatably mounted in the frame, a pair of clutch and brake elements mounted on the shaft, a pair of single acting pressure fluid motors for said clutches adapted to operatively connect said shaft to said treads, means mounted on said frame and adapted to selectively actuate said clutch and brake elements, a platform rotatably mounted on said frame, means extending between said frame and said platform, rotatably supporting said platform, power transmitting means carried by said connection and connected to said shaft, a tubular element mounted in said connection, means mounting said tubular element and adapted to resist torsional strain in said element, a pair of conduits carried by said tubular element, one of said conduits being connected to each of said motors, a source of pressure fluid for said motors, a rotatable coupling supported on said tubular element and adapted to transmit pressure fluid to each of said motors, and means connected to said conduits and adapted to selectively actuate said brakes and clutches to steer said excavator.

FRED L. WHITE.